United States Patent

[11] 3,604,249

[72] Inventor D... ...
 Cambridge, Mass.
[21] Appl. No. 738,926
[22] Filed June 21, 1968
[45] Patented Sept. 14, 1971
[73] Assignee Massachusetts Institute of Technology
 Cambridge, Mass.

[54] METHOD AND APPARATUS FOR TESTING PNEUMATIC TIRE CASINGS
 9 Claims, 4 Drawing Figs.

[52] U.S. Cl. .................................................. 73/67.2
[51] Int. Cl. ..................................................... G01h 13/00
[50] Field of Search .......................................... 73/67, 67.2, 69, 67.5, 67.6

[56] References Cited
UNITED STATES PATENTS
2,277,037 3/1942 Clark et al. ..................... 73/67.6
2,378,237 6/1945 Morris ........................... 73/67.6
2,486,984 11/1949 Rowe ............................ 73/67.2

..., ..., .... ..., .... ...jd ........................... 73/67.2

Primary Examiner—Richard C. Queisser
Assistant Examiner—John P. Beauchamp
Attorneys—Thomas Cooch, Joseph J. Alekshun, Jr. and Martin M. Santa ABSTRACT: Apparatus and method for testing pneumatic tire casings while the inflated tire is mounted on a wheel is described. A vibration source in contact with the exterior surface of the tire is caused to vibrate at the natural resonance frequency of the mounted tire. A detector sensitive to the vibration of the tire is in contact with a different region of the exterior surface of the tire. Typically, the vibrator is located on the sidewall of the tire opposite that on which the detector is located and displaced from each other in the circumferential direction. The vibrator and detector positions are maintained constant with respect to one another while they are both moved relative to the tire circumference thereby checking the vibration transmission characteristic of the entire tire. A defect in the tire cord or ply separation of the cord is evidenced by a substantial change in the detected vibration.

INVENTOR:
DAVID G. WILSON

INVENTOR:
DAVID G. WILSON
BY
ATTORNEY

METHOD AND APPARATUS FOR TESTING PNEUMATIC TIRE CASINGS

This invention relates to the method and apparatus for inspecting the casings of pneumatic tires while the tire is mounted on the wheel at its normal tire pressure. The inspection determines whether there are defects, such as a break in the cord of the tire or such as ply separation either between plies or between the outermost ply and the tread portion of the tire. These defects are usually not apparent upon visual examination.

Defects in tires which may result in sudden catastrophic failure of the tire at turnpike speeds need to be conveniently and inexpensively detected so that this cause of accidents may be decreased, if not completely eliminated. Applicant's apparatus and method satisfy these criteria since the apparatus is simple and inexpensive while, at the same time, it can be used to check a tire in a short time while the tire and wheel remain mounted on the car. Thus, for example, the apparatus described herein, when suitably modified, can be located at the entrance booth to a turnpike to routinely check the vehicle tires while the occupants remain in the vehicle and are not substantially inconvenienced because of the short period required for testing. The apparatus is suitable for tire testing without requiring that the car be lifted, in order that the tire be out of contact with the roadway, which is a factor in getting fast inspection of the tire. Substantially, the entire tire may be tested by rotating the tire with respect to the testing apparatus which tests only a limited circumference region of the tire at any instant. The rotation of the tire may be accomplished without removing the tire from the vehicle, maintaining the test apparatus stationary, while rotating the tire by having it press upon a roller in the roadway or a test stand or, alternatively, by moving the test apparatus along the roadway as the vehicle is rolling slowly in the same direction.

The defects in tires which the present apparatus is designed to detect are those which occur both in new and old tires, more frequently occurring in the latter as evidenced by the higher failure rate of retreaded tires. The defects may occur during manufacture of the supposedly perfect new tire, or they may occur because of fatigue or impact or their combination on tires which have been used. It thus becomes apparent that a defect may occur at any time during the life of the tire; and the more frequently inspection occurs, the safer will be the occupants of the vehicle whose tires have been inspected. Frequency of inspection dictates that low cost and high speed for each inspection are requisites.

It is, therefore, an object of this invention to provide an apparatus and method which is low in initial cost and low in cost of time spent per inspection. Achieving these objectives results in consequent greater utilization and enhancement of highway safety.

PRIOR ART

Apparatus for testing for defects in pneumatic tires casings using a vibrator source and a detector of vibrations has been disclosed in prior art patents to Linse, U.S. Pat. No. 2,345,679, and Morris, U.S. Pat. No 2,378,237. The apparatus and method of Linse relies on the difference in transmission of vibration through an air pocket caused by ply separation as compared with the transmission through bonded plies. The source and the detector are directly opposite one another, one being on the outside of the tire while the other is on the inside of the tire. The source and detector thus are sensitive to only a limited region about the axis through them and, therefore, they must be moved over the entire surface of the tire, the tread and sidewall regions, to obtain a complete check of the tire. The frequency of oscillation of the vibratory source is apparently chosen as a matter of convenience since forced vibration of the tire surface is employed. The tire is also tested in a noninflated condition off the wheel with the sidewalls substantially distended to produce the air gap between ply separations; otherwise the plies will be in substantially contiguous relation according to Linse. The apparatus of Morris is similar to that of Linse, differing in immersion of the tire in a liquid coupling medium by Morris to increase the coupling of the source and detector to the tire being tested and the use of high or ultrasonic frequency.

SUMMARY OF THE INVENTION

A vibration source, preferably of variable frequency, is placed in contact with the inflated tire to be tested, preferably on a sidewall of the tire. A vibration-sensitive detector is also placed in contact with the tire, preferably on the other sidewall of the tire. The frequency of the vibration source is adjusted to the natural vibrational frequency of the tire which will be evidenced by a maximum being reached in the output signal level of the vibration detector. The detector is moved along the sidewall in a circumferential direction and also radially toward or away from the tire bead to a region of a null in the standing wave pattern of the tire resonance. Thereafter, the source and detector are retained in these positions with respect to one another and with respect to the tire as the tire is rotated about its axis. If the tire lacks defects, the output signal level will remain relatively constant as the tire is rotated; whereas a defect of either ply separation or a ply break will be evidenced by a significant variation in the output signal level as different portions of the tire are examined during its rotation. Because both the vibration source and detector are desirably located not too distant from the rims of the wheel on which the tire is mounted, the condition of the tire between the source and detector through a complete revolution of the tire provides a test of substantially the entire tire casing with perhaps the exclusion of that portion of the tire immediately adjacent to the wheel rims.

THE INVENTION

The method and apparatus of this invention is capable of determining defects in the cord of a ply, such as a cut or break and also separation between plies or between the plies and the tread. This determination is made while the tire is mounted on the wheel at its normal pressure. The tire may be raised off the ground, or it may be in contact with the ground while supporting the weight of the vehicle.

Figure 1:
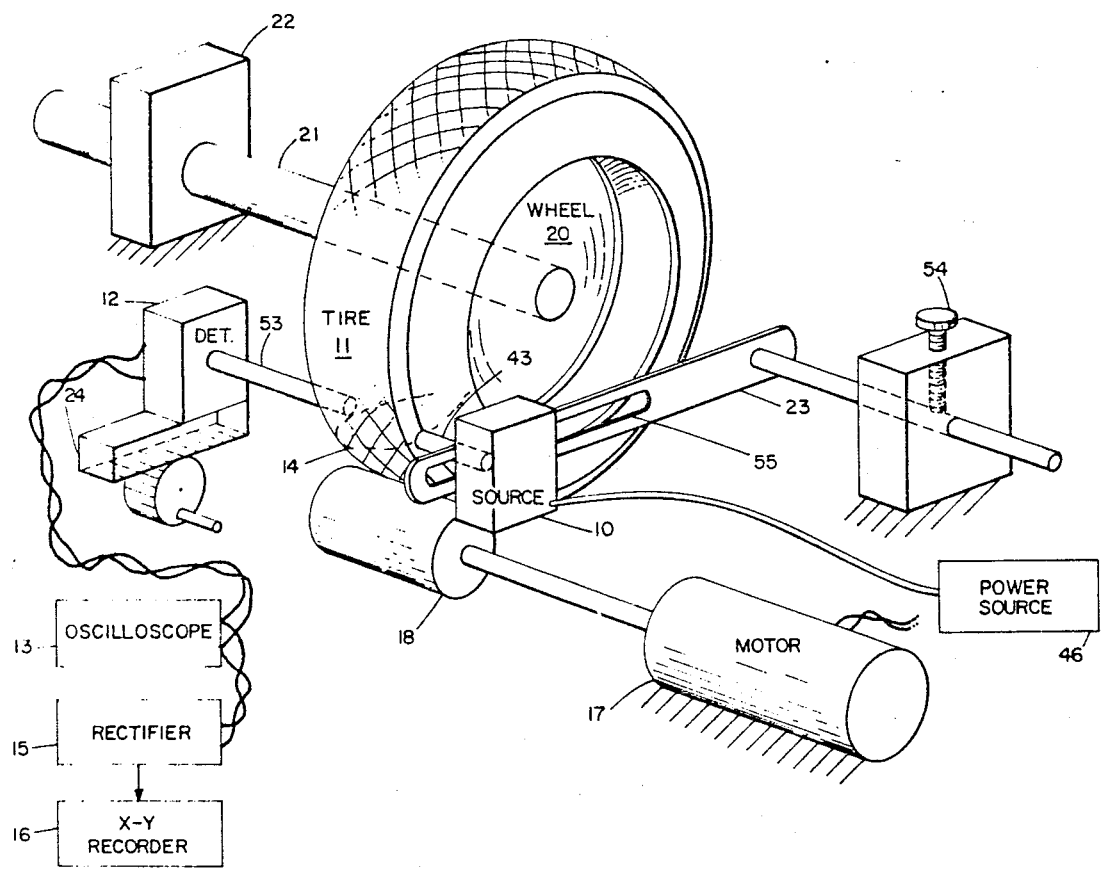
FIG. 1 is a perspective view of a preferred embodiment of the tire testing apparatus.

A vibration source 10, preferably of variable frequency, is placed in contact with the sidewall of tire 11. A vibration-sensitive detector 12 is also placed in contact with the other sidewall of the tire. The frequency of the vibration source 10 is adjusted to that of the natural vibrational frequency of the tire as determined by the increase in output signal from detector 12 as displayed on oscilloscope 13. For maximum sensitivity to defects, it was found that the detector 12 should be displaced in the circumferential direction from the source 10. The displacement was such that the detector and source lie substantially along the line whose direction is that of the cords of a ply. The edge 14 of the cord of a cross-biased ply is shown in FIG. 1, together with a preferred location of source 10 and detector 12 along the edge of a cord. The exact pattern of the tire resonance is not known, but it appears to be the first order of standing transverse waves travelling along the cord directions. Sand-pattern analysis showed that both circumferential and radial modes were present at the resonant frequency. It was observed that nulls were obtained at points on one side of the tire corresponding to the edges of the cords which were excited on the other side. The detector 12 output was found to be most sensitive to defects when it was located at a null point. A defect would cause a greater change in signal level when the detector was in a null position than if the detector was otherwise positioned.

The resonant frequency was found to depend upon the type of tire, critically upon the tire pressure, and to a limited extent, on the tire load. Typically, the resonant frequency was in the range of 200 to 350 cycles for a passenger-car-size type for normal air pressure and load. Table I gives values obtained for representative tires at 28 lb./in$^2$ inflation pressure and 900 lbs. load.

TABLE I

| Tire | Size | Resonant Frequency(c.p.s.) |
| --- | --- | --- |
| Michelin X | 1.65-15 | 240 |
| U.S. Royal | 8.25-14 | 250 |
| Mobil Premium | 7.60-15 | 260 |
| Firestone Deluxe Champion (2-ply tire) | 8.15-15 | 320 |

Figure 2:
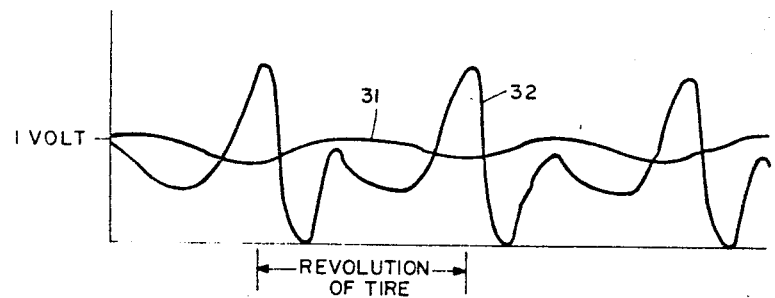
FIG. 2 shows typical output signal waveforms obtained for a defective and nondefective tire.

Typical output waveforms from the detector for a sound, defectless tire and for a tire having a cut in the outermost ply are shown in FIG. 2. It is observed that a tire having no known defects produces an output signal waveform 31 at a null point having an average amplitude of one volt with a 0.3 volt peak-to-peak variation. Waveform 32, having a 2-volt peak-to-peak variation, occurs with approximately a ¼-inch cut in the outer-ply tread region of a Firestone tire under the conditions stated in table I. When the size of the cut was greater than one-quarter inch, no further increase in signal variation was observed. The peak amplitude of waveform 32 occurs when the cut occurs in the path between the source 10 and detector 12. The output signal obtained from detector 12 is provided to oscilloscope 13 for initial inspection and to a rectifying circuit 15, which converted the AC signal to a DC signal proportional to the amplitude of the AC signal. The DC signal was then provided to an X-Y recorder 16 for permanent recording. The waveforms of FIG. 2 are smoothed, rectified signals as presented on recorder 16 obtained when the tire was rotating at one revolution per 5 seconds when driven by motor 17 through a friction contact with roller 18. The speed of revolution of the tire is chosen high enough to allow useful presentation on the oscilloscope while being below the speed at which the smoothing network would attenuate the output signal too greatly. If desired, tire 11 may be rotated by hand at very low speed while a meter 19 is observed or the X coordinate of the X-Y recorder 16 is synchronized with the tire 11 rotation in a manner not shown but readily achieved by one skilled in the art. Tire 11 is shown in FIG. 1 as mounted on wheel 20 whose axle 21 is, in turn, rotatably supported by pillow block 22. In practice, the wheel may be supported by the axle of an automobile.

The null obtained with the defectless tire is abut 1 volt average value, rather than a zero null. Lower speeds of rotation could be used if the oscilloscope or other indicating device is of the type capable of presenting a useful signal at these lower speeds of rotation. An ordinary direct-current meter may be used as the indicating device where the difference between minimum and maximum output signals would be indicative of the condition of the tire casing, just as the waveforms 31 and 32 are visually interpreted by observing the minimum and maximum output signal. A mechanical indicator, such as that described by Linse, U.S. Pat. No. 2,345,679, would also be suitable.

The vibration source 10 may be any source capable of applying to the tire a force sufficient to be detected by the detector 11. The more sensitive the detector, the less force need be supplied by the source. Because of the desirability of a variable-frequency source, an electrically driven vibrator capable of being driven by an electrical source is most convenient. Such a vibrator may be constructed from a variable-speed AC motor energized from a variable-frequency electrical source; an electromagnetically driven vibrator as in the Linse patent, energized from a variable-frequency electrical source; or a variable-speed DC motor energized from a variable DC voltage source The motors are caused to be unbalanced and their vibration transferred to the tire through mechanical contact.

Figure 3:
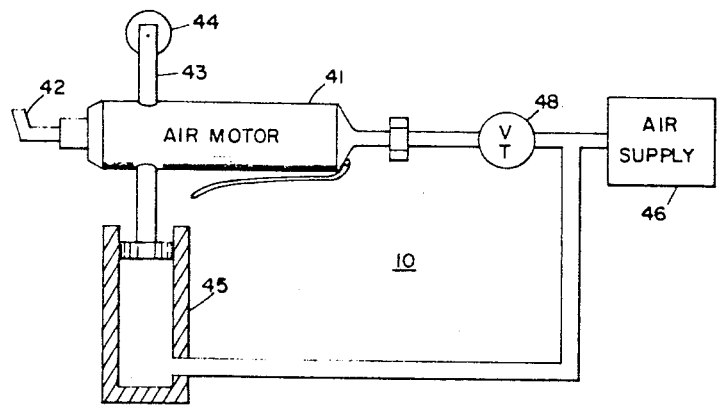
FIG. 3 is a pictorial representation of an air-motor vibration source.
Figure 4:
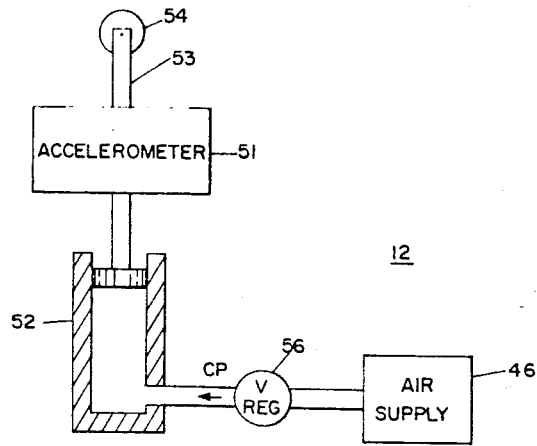
FIG. 4 is a pictorial representation of a vibration detector.

Another type of vibration source used for convenience in the embodiment of this invention comprised a variable-speed industrial grinder air-motor 41. The motor operates on 90-110 p.s.i.g. and has a speed range of 0-40,000 r.p.m. An unbalanced rod 42 is mounted in the chuck of the motor to provide vibration forces. The motor is connected to a bearing support 43 on which a ball or roller bearing 44 is mounted, which can be pressed against the tire sidewall while the tire is rotating. An air cylinder 45 connected to air supply 46 presses the bearing 44 against the tire with substantially constant pressure irrespective of the tire runout. The cylinder 45 may be slideably attached to a rotatable supporting structure 23 to allow the vibration source 10 to be positioned at the desired circumferential spacing from detector 12 and secured in that position by setscrew 54 and also to allow source 10 to contact the tire at different radial distances from the bear region of the tire and secured in that position by a fastener, not shown, in slot 55. Alternatively, the source 10 can be attached to rack and pinion 24 while the detector 12 is mounted on moveable structure 23. By adjustment of valve 48, the frequency range of the motor 41 is 0-600 c.p.s. and the amplitude at 300 c.p.s. is about ±1/32 inch measured at the bearing 44. The air-motor speed controlled by valve 48 was not constant but was sufficient to allow the resonant frequency to be maintained for a time adequate to determine the condition of the tire casing from data as in FIG. 3.

The vibration pickup or detector 11 comprises an AC accelerometer 51, which may be mounted on an air cylinder 52 so that its pickup arm 53, contacting the tire through a bearing 54, may be held against the tire with a constant force. Cylinder 52 is mounted on a rack and pinion gear 24 to allow radial movement. The force is exerted by a small cylinder 52 of 1-inch diameter connected through an air regulator 56 to a 190 p.s.i.g. supply 46. This allows a preselected load to be maintained at a constant value on the pickup-arm assembly. The entire assembly should be capable of being positioned radially on almost any sidewall segment; and, if the source 10 is fixed in circumferential position, the assembly of detector 12 should be circumferentially moveable over a sufficient distance to achieve the necessary separation of the source 10 and detector 12. As an example of the separations actually used in testing tires, the biased-cord ply Firestone tire of table I had a 9-inch separation of source and detector in the circumferential direction measured at their radial projections to the rim of the wheel. Other commercially available vibration-sensitive detectors may be used instead of the accelerometer 51. The microphone arrangement of the Linse patent may also possibly be useful as the detector 12.

It was experimentally observed that radial-ply tires behaved in somewhat the same way as cross-ply tires. Resonance was much more sharply defined, resulting from the lower 0damping in the tire. Difficulty in stabilizing the frequency of the air-motor 41 resulted in considerable difficulty in getting significant data on the radial-ply tire, but several good tests were made and significant variations in output signal were observed for a cord defect. Best results were obtained with the source 10 and the detector 12 located 180° from each other as this was the null point for the radial-ply tire tested. Thus, the radial-ply tire was tested with a 23-inch separation between source and detector, whereas the cross-ply tires had only about a 9-inch separation. It should also be noted that the null point used in testing the radial-ply tire was not along the cord direction as it was in the cross-ply tire.

Tread depth of the tire was observed to have a significant effect. Tires with new (11/32 inch) tread showed increased damping and a less-sharp resonance peak. Ply cuts in general did not show up as well as on tires with worn tread.

Although the apparatus has been described in the preferred embodiment as having the detector on the sidewall opposite that of the source, the detector may be placed on other portions of the exterior surface of the tire, including the same sidewall, if the lower sensitivity to defect detection can be accepted. This is so because at the resonant frequency the entire tire is vibrating albeit with reduced amplitude the farther from the source of vibration. The detector is also preferably placed in the vicinity of a null region of the resonance standing wave pattern; however, it need not be so placed if the consequent lower detection capability is adequate. The source and detector are preferably close to the wheel rim to enhance the signal disturbance effects caused by defects between them. However, there is a practical limit imposed on their proximity to the rim because of the damping effect on the vibration produced by the tire rigidity near the rim.

Various modifications may be made in the construction and arrangement of the parts without departing from the scope of the invention.

Having described my invention, I claim:

1. Apparatus for testing the casing of an inflated tire comprising,
    means for producing a resonant vibration in said tire by applying a force of the resonant frequency to the exterior of said tire at one region of the tire,
    means for sensing the vibration at the exterior surface of said tire at another region spaced from said one region,
    means for maintaining constant the position of said vibration producing means with respect to said sensing means, while rotating said tire with respect to said vibration producing and sensing means,
    said sensing means providing an output signal to an indicating instrument whose amplitude is proportional to the amplitude of the sensed vibration as said tire is rotated.

2. The apparatus of claim 1 wherein said vibration producing means comprises,
    a mechanical vibrator in contact with a small region of said tire,
    a source of power for said vibrator to energize the vibrator,
    said vibrator having a vibration frequency range which includes the resonant frequency of said tire,
    means for holding said vibrator against said tire with a constant pressure,
    said holding means being adapted to allow said vibrator to be circumferentially and radially positioned with respect to said tire.

3. The apparatus of claim 2 wherein said vibration sensing means comprises,
    a vibration-sensitive detector,
    means for holding said detector in contact with a different small region of said tire with a constant pressure,
    said detector holding means being adapted to radially position said detector with respect to said tire.

4. The apparatus of claim 3 wherein,
    the contact region of said vibrator is on one sidewall of the tire and the contact region of said detector is on the other sidewall.

5. The apparatus of claim 3 wherein,
    said detector and vibrator holding means is a separate air cylinder for each holding means,
    each cylinder being maintained at a constant pressure from an air supply,
    and said detector and vibrator have a roller at their point of contact with the tire.

6. The method of testing the casing of an inflated tire for defects comprising,
    inducing a resonant vibration in said tire by applying a force at the resonant frequency to the exterior surface at one region of said tire,
    detecting the amplitude of the resonant vibration on the exterior surface of said tire at a region spaced from said one region,
    causing said detected vibrations to energize an indicating device in proportion to the intensity thereof,
    rotating said tire about its axis,
    maintaining the positions of applications of said induced vibration and said detected vibration constant with respect to each other and to said tire configuration as said tire is rotated.

7. The method of claim 6 wherein said detecting of the resonant vibration comprises in addition,
    detecting the vibration at different positions on said tire whereby the null point of the tire resonant vibration is determined,
    maintaining said null point position,
    and thereafter rotating said tire while said detecting position is maintained in the null position.

8. The method of claim 7 comprising applying the force to one sidewall of the tire, and detecting the resonant vibration on the other sidewall of the tire.

9. The apparatus of claim 1 comprising in addition
    means for moving said sensing means with respect to said vibration producing means.